US 7,825,858 B2

(12) United States Patent
Blessing et al.

(10) Patent No.: US 7,825,858 B2
(45) Date of Patent: Nov. 2, 2010

(54) METHODS AND SYSTEMS FOR FREQUENCY INDEPENDENT BEARING DETECTION

(75) Inventors: John C. Blessing, Spring Hill, KS (US); Weiguang Hou, Lenexa, KS (US); Edward W. Needham, Wellsville, KS (US)

(73) Assignee: Garmin International, Inc., Olathe, KS (US)

( * ) Notice: Subject to any disclaimer, the term of this patent is extended or adjusted under 35 U.S.C. 154(b) by 287 days.

(21) Appl. No.: 11/968,574

(22) Filed: Jan. 2, 2008

(65) Prior Publication Data

US 2008/0204310 A1    Aug. 28, 2008

Related U.S. Application Data

(60) Provisional application No. 60/892,029, filed on Feb. 28, 2007.

(51) Int. Cl.
*G01S 5/04* (2006.01)
(52) U.S. Cl. ...................................................... 342/442
(58) Field of Classification Search .................. 342/442
See application file for complete search history.

(56) References Cited

U.S. PATENT DOCUMENTS

| | | | |
|---|---|---|---|
| 2,489,304 A | 11/1949 | Marchand et al. | |
| 3,212,089 A | 10/1965 | Longacre et al. | |
| 3,500,303 A | 3/1970 | Johnson | |
| 3,697,876 A | 10/1972 | Robbins et al. | |
| 3,787,863 A | 1/1974 | Watanabe et al. | |
| 3,789,408 A | 1/1974 | Ichihara et al. | |
| 3,824,595 A | 7/1974 | Hall | |
| 3,878,381 A | 4/1975 | Broder et al. | |
| 3,887,923 A | 6/1975 | Hendrix | |
| 3,890,617 A | 6/1975 | Moulton | |
| 3,927,406 A | 12/1975 | Bruder | |
| 3,935,575 A | 1/1976 | Leisterer et al. | |
| 3,973,262 A | 8/1976 | Böhm | |
| 4,000,466 A | 12/1976 | Scouten et al. | |
| 4,090,199 A | 5/1978 | Archer | |

(Continued)

OTHER PUBLICATIONS http://embeddeddsp.embedded.com/showArticle.jhtml;jsessionid=XBDNFUFIRPSRWQSNDLPCKHSCJUNN2JVN?articleID=60401726; 10 pages; printed Aug. 7, 2006.

(Continued)

*Primary Examiner*—Thomas H Tarcza
*Assistant Examiner*—Harry Liu
(74) *Attorney, Agent, or Firm*—Samuel M. Korte

(57) ABSTRACT

A system and method are provided for estimating bearing of a target based on RF signals received by an array of antenna elements. The system comprises first and second input channels that are configured to receive analog signals that correspond to first and second antenna elements. The system also includes an analog to digital converter module for converting each of the analog signals to digital data samples and outputting separate streams of digital data samples corresponding to each of the first and second antenna elements as first and second data streams. An in-phase and quadrature detector module includes a phase shift module for shifting each of the first and second data streams by a predetermined amount of time to form first and second phase shifted data streams. A surveillance module determines a bearing of the target based on in-phase and quadrature data.

17 Claims, 5 Drawing Sheets

U.S. PATENT DOCUMENTS

| | | | |
|---|---|---|---|
| 4,123,759 A | 10/1978 | Hines et al. |
| 4,203,114 A | 5/1980 | Gerst et al. |
| 4,209,791 A | 6/1980 | Gerst et al. |
| 4,333,170 A | 6/1982 | Mathews et al. |
| 4,366,483 A | 12/1982 | Hagedon et al. |
| 4,488,155 A | 12/1984 | Wu |
| 4,591,862 A | 5/1986 | Parkhurst et al. |
| 4,626,859 A | 12/1986 | Stansfield |
| 4,638,320 A | 1/1987 | Eggert et al. |
| 4,638,321 A | 1/1987 | Drogin |
| 4,639,733 A | 1/1987 | King et al. |
| 4,689,623 A | 8/1987 | Schwab et al. |
| 4,719,465 A | 1/1988 | Kuroda |
| 4,796,031 A | 1/1989 | Koki |
| 4,809,012 A | 2/1989 | Tong |
| 4,855,748 A | 8/1989 | Brandao et al. |
| 4,888,593 A | 12/1989 | Friedman et al. |
| 4,899,157 A | 2/1990 | Sanford et al. |
| 4,924,232 A | 5/1990 | Hudson et al. |
| 4,926,184 A | 5/1990 | Galati et al. |
| 4,947,176 A | 8/1990 | Inatsune et al. |
| 4,975,710 A | 12/1990 | Baghdady |
| 4,996,532 A | 2/1991 | Kirimoto et al. |
| 5,003,314 A | 3/1991 | Berkowitz et al. |
| 5,008,844 A | 4/1991 | Kyriakos et al. |
| 5,072,224 A | 12/1991 | Vebeke et al. |
| 5,122,808 A | 6/1992 | Kyriakos |
| 5,191,349 A | 3/1993 | Dinsmore et al. |
| 5,253,188 A | 10/1993 | Lee et al. |
| 5,276,452 A | 1/1994 | Schuss et al. |
| 5,341,145 A | 8/1994 | Eckersten et al. |
| 5,469,172 A | 11/1995 | Schleder et al. |
| 5,541,607 A | 7/1996 | Reinhardt |
| 5,541,608 A | 7/1996 | Murphy et al. |
| 5,552,788 A | 9/1996 | Ryan et al. |
| 5,568,154 A | 10/1996 | Cohen |
| 5,589,838 A | 12/1996 | McEwan |
| 5,598,437 A | 1/1997 | Gourse |
| 5,604,504 A | 2/1997 | Nail |
| 5,619,206 A | 4/1997 | Cole, Jr. et al. |
| 5,657,027 A | 8/1997 | Guymon, II |
| 5,724,047 A | 3/1998 | Lioio et al. |
| 5,764,187 A | 6/1998 | Rudish et al. |
| 5,815,117 A | 9/1998 | Kolanek |
| 5,867,535 A | 2/1999 | Phillips et al. |
| 5,889,491 A | 3/1999 | Minter |
| 5,943,010 A | 8/1999 | Rudish et al. |
| 6,018,644 A | 1/2000 | Minarik |
| 6,054,948 A | 4/2000 | Dean |
| 6,064,338 A | 5/2000 | Kobayakawa et al. |
| 6,085,151 A | 7/2000 | Farmer et al. |
| 6,127,966 A | 10/2000 | Erhage |
| 6,169,519 B1 | 1/2001 | Holecek et al. |
| 6,204,812 B1 | 3/2001 | Fattouche |
| 6,285,313 B1 | 9/2001 | Wahab et al. |
| 6,392,598 B1 * | 5/2002 | Jones et al. ................ 342/442 |
| 6,433,738 B1 | 8/2002 | Kikuchi |
| 6,441,783 B1 | 8/2002 | Dean |
| 6,486,839 B1 | 11/2002 | Minter |
| 6,529,820 B2 | 3/2003 | Tomescu |
| 6,587,069 B2 | 7/2003 | Ringwald et al. |
| 6,587,863 B1 | 7/2003 | Gentile et al. |
| 6,606,055 B2 | 8/2003 | Halsema et al. |
| 6,611,231 B2 | 8/2003 | Crilly, Jr. et al. |
| 6,727,842 B1 | 4/2004 | Schleder et al. |
| 6,778,138 B2 | 8/2004 | Purdy et al. |
| 6,792,033 B1 | 9/2004 | Maruta et al. |
| 6,795,018 B2 | 9/2004 | Guo |
| 6,876,323 B2 | 4/2005 | Feldle et al. |
| 6,999,022 B1 | 2/2006 | Vesel et al. |
| 7,439,901 B2 | 10/2008 | Needham et al. |
| 7,576,686 B2 | 8/2009 | Needham et al. ............ 342/174 |
| 2002/0000836 A1 * | 1/2002 | Brachmann et al. ............ 327/7 |
| 2003/0206134 A1 | 11/2003 | Lier et al. |
| 2006/0071845 A1 | 4/2006 | Stroili et al. |
| 2008/0055150 A1 | 3/2008 | Hou et al. .................... 342/40 |
| 2008/0284637 A1 | 11/2008 | Blessing et al. ............... 342/30 |

OTHER PUBLICATIONS

Interferometer Design for Evaluation Angle Estimation, IEEE Transactions on Aerospace and Electronic Systems, vol. AEX-13, No. 5, pp. 486-503 (Sep. 1977).

RJ Zavrel, RF Design, Mar. 1988, pp. 27-31.

Wojtasiak, W. et al.;The 100W class A power amplifier for L-band T/R module; Microwaves, Radar and Wireless Communications. 2000. MIKON-2000, 13$^{TH}$ International Conference on; vol. 2, May 22-24, 2000 pp. 675-677 vol. 2.

Federal Aviation Administration TCAS Home Page printed from Http://adsb.tc.faa.gov/TCAS.htm.

* cited by examiner

METHODS AND SYSTEMS FOR FREQUENCY INDEPENDENT BEARING DETECTION

RELATED APPLICATION

The present application claims the benefit of U.S. Provisional Application No. 60/892,029, entitled "METHODS AND SYSTEMS FOR FREQUENCY INDEPENDENT BEARING DETECTION," filed Feb. 28, 2007, which is herein incorporated by reference in its entirety.

BACKGROUND OF THE INVENTION

The present invention generally relates to methods and systems for determining bearing, and more specifically, for determining bearing independent of frequency.

Today, systems exist for use in aircraft surveillance for collision avoidance and traffic alert. These conventional systems use active interrogation of mode select (Mode-S) and Air-Traffic Control Radar Beacon System (ATCRBS) transponders that incorporate a passive phased array antenna. Conventional Mode-S and ATCRBS transponders transmit encoded messages containing information about the aircraft in response to interrogation signals received from ground based radar or from an aircraft with a traffic avoidance system (TAS), or traffic alert and collision avoidance system (TCAS). When the transponder is not broadcasting, the transponder monitors for transmissions including interrogation signals.

TAS and TCAS equipment transmits interrogation signals that are received and replied to by other aircraft and used to determine the location of other aircraft relative to the originating aircraft position. Conventional TAS and TCAS systems include a 4-element antenna coupled to a radio frequency (RF) transmitter/receiver. The transmitter and receiver are remotely coupled to the antenna array by coaxial transmission lines. The coaxial transmission lines may be several feet in length (e.g., 30 feet long). The antenna array utilized by conventional TCAS systems are "passive", in that substantially all of the power utilized to drive the antenna array elements is produced at the transmitter/receiver. Similarly, all of the power that is used to boost the receive range of the antenna array is provided at the transmitter/receiver.

The transmitter and receiver are in turn coupled to a signal processor that controls transmission and reception of TAS and TCAS related information and that performs aircraft surveillance operations, such as traffic alert and collision avoidance operations. The transmitter is coupled to the signal processor for transmitting, among other things, interrogation signals. A control panel and display are joined to the signal processor for operating the TAS/TCAS system and for displaying TAS/TCAS information.

The TAS/TCAS system identifies the location and tracks the progress of a target aircraft equipped with beacon transponders. As part of the locating and tracking operations, the TAS/TCAS system determines a bearing to the target aircraft based on received signals from the transponder of the target aircraft. Currently, there are three versions of the TCAS system in use or in development; TCAS I, II, and III. TCAS I, the simplest of the systems, is less expensive but also less capable than the others. The TCAS I transmitter sends signals and interrogates Mode-C transponders. The TCAS I receiver and display indicate approximate bearing and relative altitude of all aircraft within the selected range (e.g., about forty miles). Further, the TCAS system uses color coded dots to indicate which aircraft in the area pose a potential threat (e.g., potential intruder aircraft). The dots are referred to as a Traffic Advisory (TA). When a pilot receives a TA, the pilot then visually identifies the intruder aircraft and is allowed to deviate up to 300 feet vertically. Lateral deviation is generally not authorized. In instrument conditions, the pilot notifies air traffic control for assistance in resolving conflicts.

The TCAS II system offers all of the benefits of the TCAS I system, but also issues a Resolution Advisory (RA) to the pilot. In the RA, the intruder target is plotted and the TCAS II system determines whether the intruder aircraft is climbing, diving, or in straight and level flight. Once this is determined, the TCAS II system advises the pilot to execute an evasive maneuver that will resolve the conflict with the intruder aircraft. Preventive RAs instruct the pilot not to change altitude or heading to avoid a potential conflict. Positive RAs instruct the pilot to climb or descend at a predetermined rate of 2500 feet per minute to avoid a conflict. TCAS II is capable of interrogating Mode-C and Mode-S. In the case of both aircraft having Mode-S interrogation capability, the TCAS II systems communicate with one another and issue de-conflicted RAs.

The TCAS III system is similar to the TCAS II, but allows pilots who receive RAs to execute lateral deviations to evade intruders. The TCAS III system is more accurate and has a smaller bearing error. Another upgrade, that is proposed, has been to add the capability to transmit the aircraft's GPS position and velocity vector to other TCAS-equipped aircraft thus providing information that is much more accurate.

Each of the above-described surveillance systems utilizes a phase antenna array that, during transmission operations, performs antenna pattern phasing and, during reception operations, determines bearing angle to target aircraft. In certain conventional systems, a quadrature demodulator is used as a phase detector circuit to determine the bearing to the target aircraft. Often, the phase detector circuit is formed from numerous analog discrete components that need to be "linearized" through an analog feed-back loop. The feed-back loop complicates system calibration and the overall circuit design. Also, the analog phase detector circuit exhibits a dynamic range that is unduly limited. Further, the phase detector circuits require isolation of each antenna element channel.

Further, a conventional digital phase detector has been proposed that performs direct intermediate frequency sampling through A/D converters. The digital phase detector is used to determine the phases of the received signals. The conventional digital phase detector uses an internal reference waveform that is mixed separately with each of the received signals. The combinations from the mixing operations are then used to calculate an actual phase of each receive signal. However, the conventional digital phase detector has experienced certain limitations. First, calibration of the detector is difficult and complicated. Also, each channel must be isolated to ensure the accuracy of each calculated actual phase.

Improved bearing detection methods and systems are needed that address and overcome the difficulties noted above and otherwise experienced heretofore.

SUMMARY

In accordance with one embodiment, a system is provided for estimating bearing of a target, based on RF signals received by an array of antenna elements. The system comprises first and second input channels that are configured to receive analog signals that correspond to cross first and second antenna elements. The system also includes an analog to digital converter module for converting each of the analog signals to digital data and outputting separate digital data streams corresponding to each of the first and second antenna elements. A phase detector module includes a phase shift module for shifting each of the first and second data streams by a predetermined amount of time to form first and second phase shifted data streams. The phase detector module calculates in-phase data based on the first and second data streams and calculates quadrature data based on the first and second data streams and the first and second phase shifted data streams. A surveillance module determines a bearing of the target based on the in-phase and quadrature data.

Optionally, the phase detector module may include an in-phase and quadrature detector module implemented on a field programmable gate array and programmed to function as a pair of digital phase interferometers, wherein each digital phase interferometer processes data streams from cross antenna elements. Optionally, the in-phase and quadrature detector module may calculate opposite first and second pseudo quadrature components based on reverse combinations of the first and second phase shifted data streams and the first and second data streams. The first and second pseudo-quadrature components may then be used to calculate difference quadrature components and summed quadrature components.

In accordance with another embodiment, a method is provided for estimating bearing of a target based on RF signals received by an array of antenna elements. The method comprises receiving analog signals from first and second antenna elements, converting each of the analog signals to digital data and outputting separate digital data streams corresponding to each of the cross first and second antenna elements. The method further includes shifting each of the first and second data streams by a predetermined amount of time to form first and second phase shifted data streams. In-phase data is calculated based on the first and second data streams, while quadrature data is calculated based on the first and second data streams and the first and second phase shifted data streams. The bearing of the target is determined based on the in-phase and quadrature data.

DETAILED DESCRIPTION

Embodiments of the present invention are described in connection with a bearing detection system for a Traffic Avoidance System (TAS), or Traffic Collision Avoidance System (TCAS I and TCAS II). However, it is understood that the present invention may be utilized in other applications for determining bearing to an RF signal source. For example, the system may be implemented on a marine vessel, a land-based vehicle, a portable apparatus, a hand-held device, and the like.

The Minimum Operating Performance Specifications (MOPS) for the TCAS II system is described in RTCA document DO-185A, "Minimum Operational Performance Standards for Air Traffic Alert and Collision Avoidance System II (TCAS II) Airborne Equipment", dated December 1997 and the MOPS for TCAS I and TAS are embodied in RTCA document DO-197A, "Minimum Operational Performance Standards for Active Traffic Alert and Collision Avoidance System I (Active TCAS I)" each of which is incorporated herein by reference.

Figure 1:
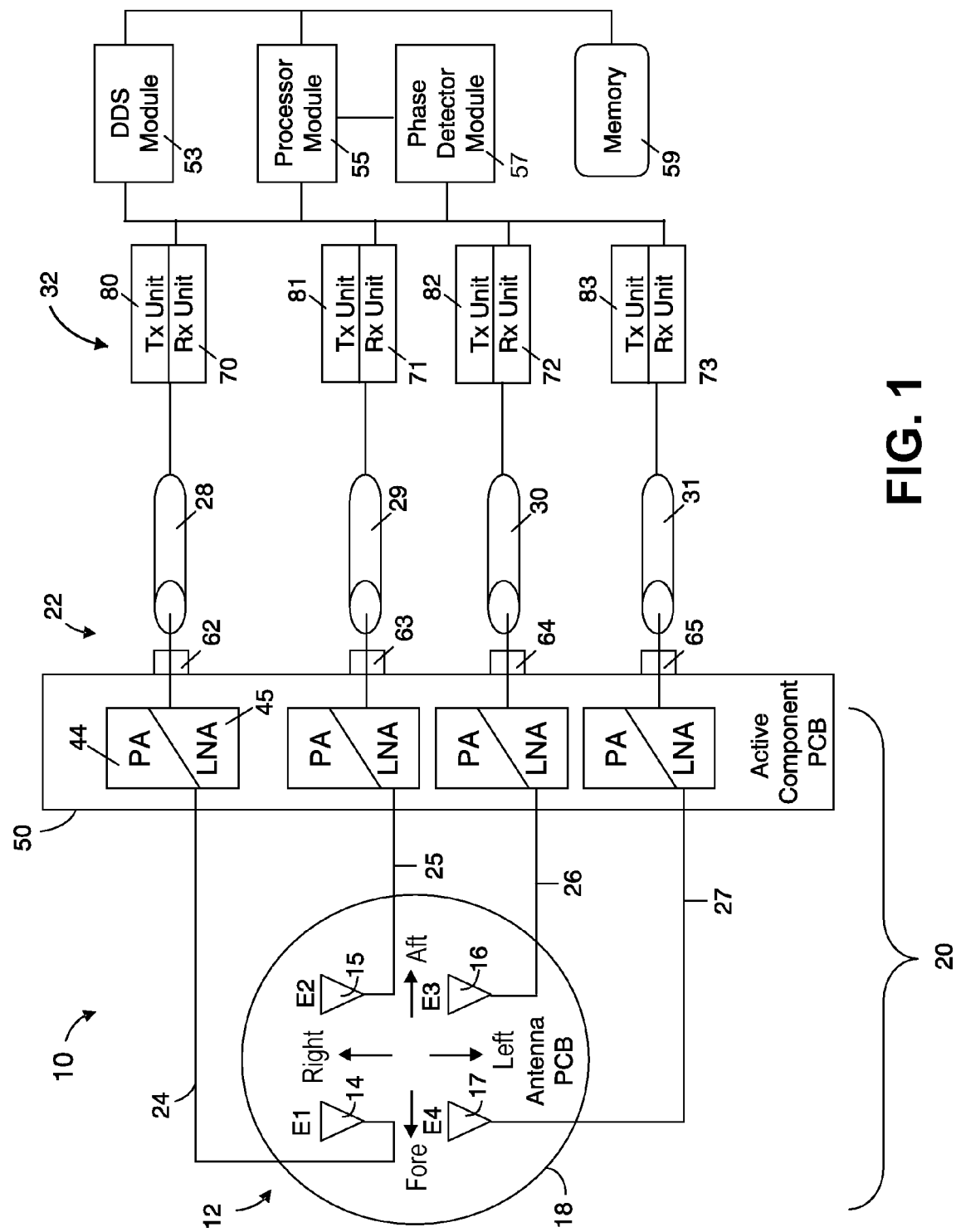
FIG. 1 illustrates a block diagram of an aircraft surveillance system formed in accordance with an embodiment of the present invention.

FIG. 1 illustrates a block diagram of an aircraft surveillance system 10 that uses an active phased array antenna in accordance with an embodiment of the present invention. The system 10 includes an antenna array 12 that comprises a plurality of antenna elements 14-17, each of which is mounted to a common antenna Printed Circuit Board (PCB) 18. The antenna elements 14-17 transmit and receive RF transmit and receive signals, for example at 1030 MHz and 1090 MHz, respectively. The antenna array 12 forms part of an antenna module 20 that is configured to be mounted to an aircraft or other device used to determine bearing to a target. Each antenna element 14-17 communicates over a separate physical channel 24-27 within the antenna module 20. The antenna module 20 includes a connector module (generally denoted by area 22) that includes separate coaxial connector elements 62-65 that are associated with each of the channels 24-27. The connector module 22 is configured to couple transmission lines 28-31 with associated corresponding channels 24-27, respectively.

The antenna module 20 may include first and second circuit boards configured to be mounted to the exterior and interior, respectively, of an aircraft. For example, the antenna module 20 preferably includes an active component PCB 50 that is interposed between the antenna PCB 18 and transmission lines 28-31. The active component PCB 50 includes power amplifiers 44 and low noise amplifiers 45 in each of channels 24-27. The power amplifiers 44 are utilized during transmission operations. The power amplifiers 44 are provided on the antenna module 50 along each transmit path and operate to increase the power level of electrical transmit signals, coming from the transmission lines 28-31. The transmit signals are amplified by the power amplifiers 44, such that each of the antenna elements 14-17 are driven by RF signals at a power level substantially higher than the power level of electrical transmit signals, coming from the transmission lines 28-31.

The low noise amplifiers 45 are provided along receive paths on the active component PCB 50. The low noise amplifiers 45 increase the power level of the electrical receive signals, received by the antenna elements 14-17, to a predetermined receive power level before outputting the electrical receive signals onto the transmission lines 28-31. Each transmission line 28-31 transmits and receives electrical transmit and receive signals, respectively, from and to a remote transmit/receive (T/R) module 32. For example, the T/R module 32 may transmit interrogation signals or transponder reply messages to the antenna array 12 and receive interrogation signals or reply information from the antenna array 12.

The T/R module 32 includes transmitter units 80-83 and receiver units 70-73 that are joined to corresponding transmission lines 28-31. The transmitter and receiver units 80-83 and 70-73 are joined to a Direct Digital Synthesis (DDS) module 53, a processor module 55 and a digital phase detector module 57. The DDS module 53 and processor module 55 communicate with the phase detector module 57 and access a memory module 59 during surveillance operations. The DDS module 53 performs beam forming in connection with transmit operations. The DDS module 53 directs the transmitter units 80-83 to transmit, from one or more antenna elements 14-17, interrogation signals in connection with surveillance transmit sequences. The surveillance transmit sequences are intended to interrogate potential sources, such as transponders on intruding aircraft within a range surrounding the protected aircraft, vehicle, vessel, or device including the system 10. The processor module 55 controls interrogation operations and surveillance transmit sequences, such as a whisper/shout pulse sequence or an ATCRBS sequence when implemented in an aircraft surveillance application. The phase detector module 57 receives, from the receiver units 70-73, signals over each of channels 24-27 and determines phase differences between cross channels.

The antenna elements 14-17 are arranged in a predetermined geometry, such as a square or diamond, and are located fixed distances from one another. The term "cross" shall be used throughout the present application to refer to particular relationships of antenna elements, receive signal channels and the like. For example, the term "cross antenna elements" shall refer to antenna elements that are located diagonally across from one another, such as antenna elements 14 and 16. Antenna elements 15 and 17 also represent cross antenna elements. Similarly, "cross channels" and "cross receive signals" shall refer to channels and receive signals joined and associated with cross antenna elements. For example, channels 24 and 26 constitute "cross channels", and receive signals conveyed over transmission lines 29 and 31 constitute "cross receive signals".

Figure 2:
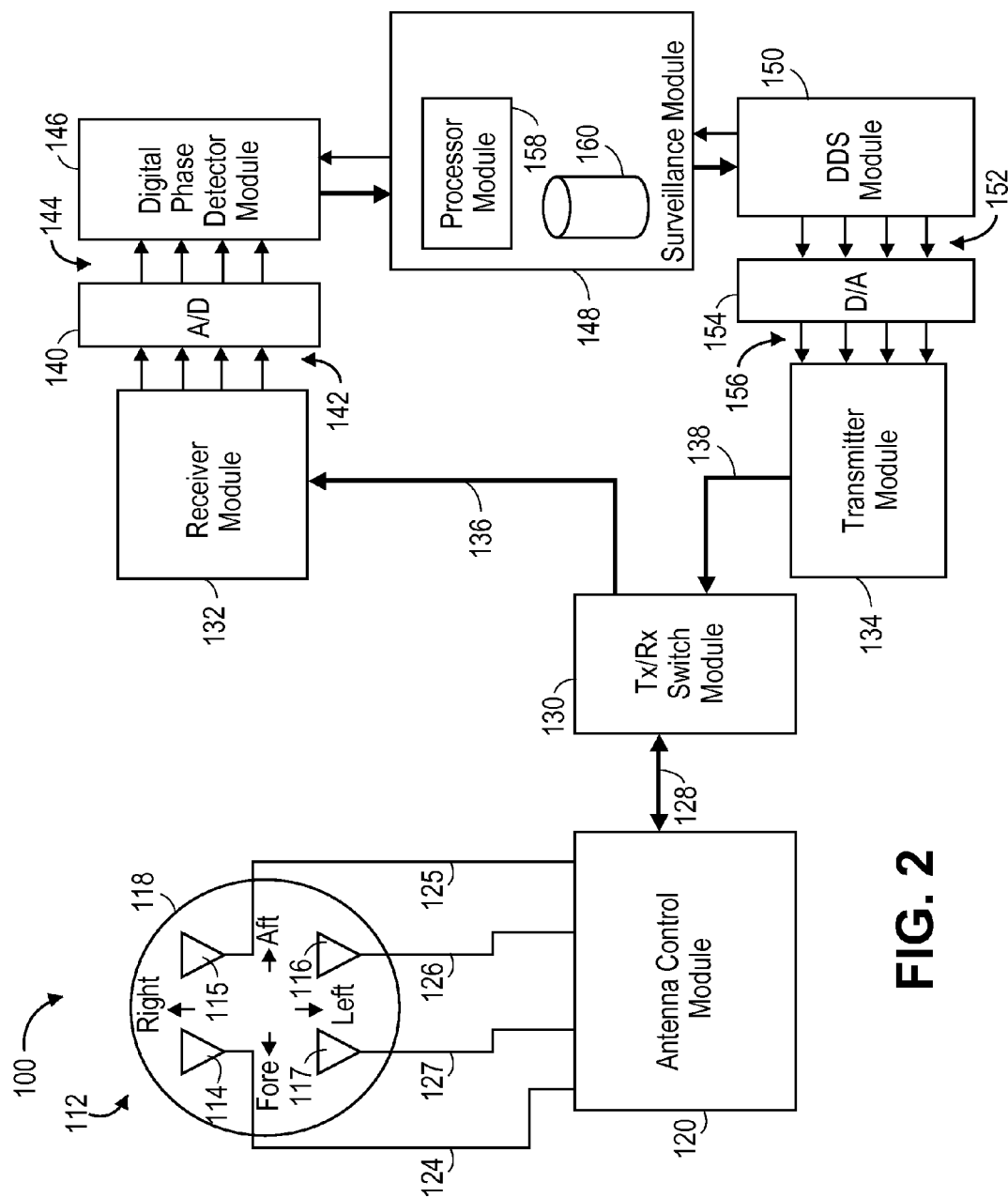
FIG. 2 illustrates a generalized block diagram of an aircraft surveillance system formed in accordance with an embodiment of the present invention.

FIG. 2 illustrates a block diagram of a surveillance system 100 formed in accordance with an embodiment of the present invention. The system 100 includes an antenna array 112 comprised of antenna elements 114-117, all of which are mounted on an antenna PCB 118. Each antenna element 114-117 is joined over a dedicated channel 124-127 to an antenna control module 120. The antenna array 112 may represent an active antenna array or a passive antenna array. The primary source of power of a passive antenna array, during transmit, is provided at a transmitter module 134 and the primary source of gain of a passive antenna array, during receive, is provided at a receiver module 132. When implemented as a passive antenna array 112, the antenna control module 120 may include filtering components and other passive or low power components. Alternatively, the antenna control module 120 may be removed entirely in a passive antenna array implementation. In an active antenna array implementation, the antenna control module 120 may include all or a portion of the components described in connection with the embodiment of FIG. 1 on the component PCB 50.

The antenna control module 120 communicates over multiple coaxial transmission lines (generally denoted at 128) with a transmit/receive switch module 130 which selectively joins the transmission lines 128 with one of the receiver module 132 and the transmitter module 134 over receive and transmit lines 136 and 138, respectively. The receive and transmit lines 136 and 138 each include multiple coaxial lines that convey analog signals to and from the transmit/receive switch module 130. During a receive operation, the transmit/receive switch module 130 joins the receiver module 132 over the receive lines 136 to an equal number of transmission lines 128. During a transmit operation, the transmit/receive switch module 130 joins the transmitter module 134 over the transmit lines 138 to an equal number of transmission lines 128.

The receiver module 132 is joined to an Analog to Digital (A/D) converter 140 via analog lines 142. The A/D converter 140 is joined over a series of digital channels 144 to a digital phase detector module 146. The digital phase detector module 146 communicates with a surveillance module 148. The surveillance module 148 is also joined to a DDS module 150 that outputs, over a number of digital channels 152, signals to be transmitted by the antenna array 112. The digital channels 152 are provided to a Digital to Analog (D/A) converter 154 that converts the digital signals to analog signals and outputs the analog signals over a number of analog lines 156 to the transmitter module 134. The surveillance module 148 includes a processor module 158 and memory module 160 that are utilized in connection with transmit and receive operations.

Each of lines 128, 136, 138, 142, and 156, along with channels 144 and 152, correspond to channels 124-127 and antenna elements 114-117. Specifically, for each antenna element 114-117, there is a channel 124-127 and line 128,136, 138,142,156 and channel 144,152. It should also be noted that while in the preferred embodiment four antenna elements 114-117 are used, other numbers of antenna elements are possible. For example, many of the objects of the present invention may be accomplished by as few as three antenna elements and associated lines and channels. Alternatively, more than four antenna elements and associated lines and channels may be used.

The operation of the system 10 in FIG. 1 and system 100 in FIG. 2 will be described hereafter as related to bearing detection operations for estimating the bearing of a target based on RF signals received by the antenna array (12 and 112). The following description is generally in connection with the embodiment of FIG. 2.

Figure 3:
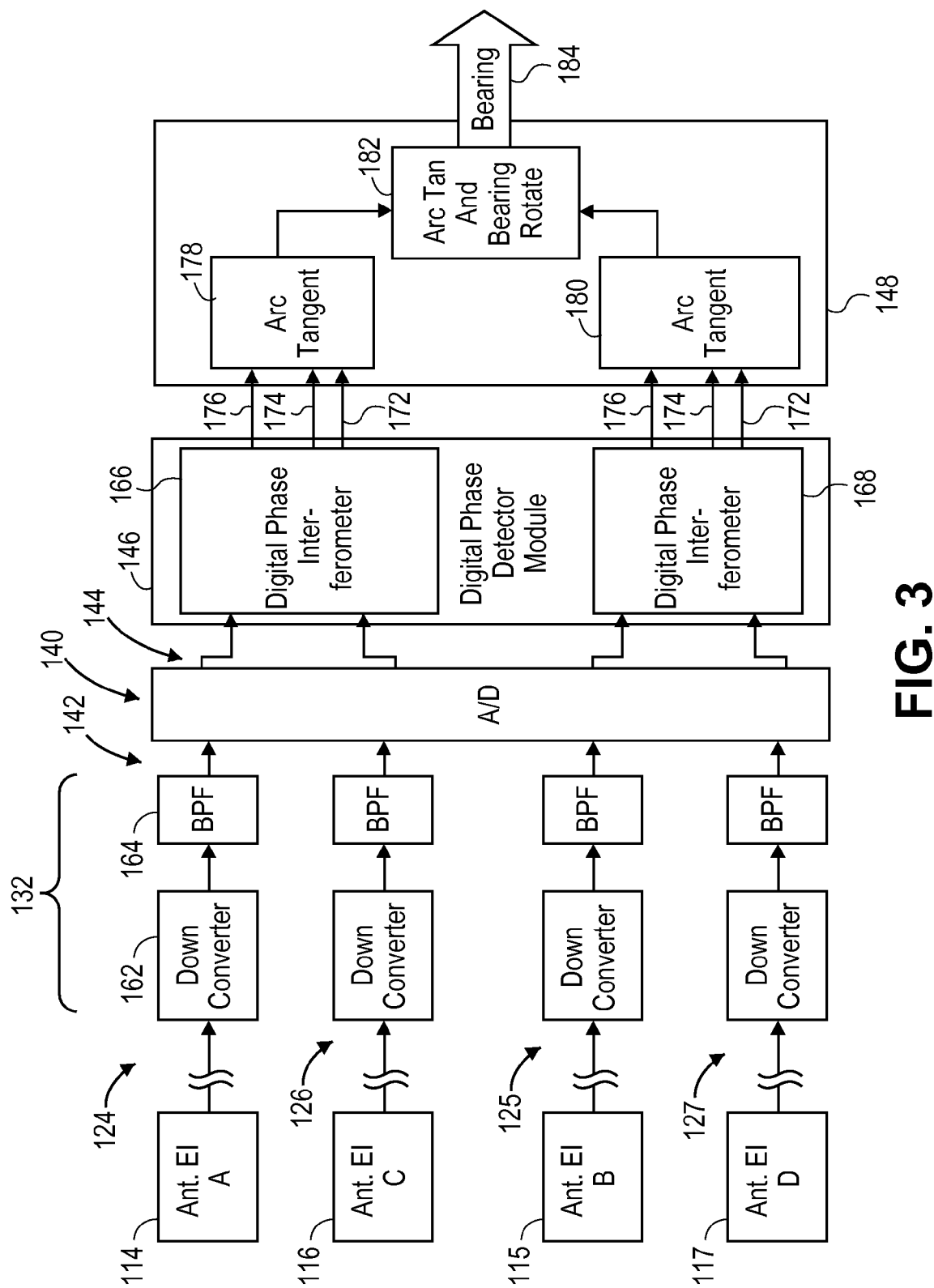
FIG. 3 illustrates a simplified block diagram of a portion of a bearing detection system formed in accordance with an embodiment of the present invention.

FIG. 3 illustrates a simplified block diagram of a portion of the system 100 utilized in connection with a bearing determination operation. During a receive operation, RF signals received by the antenna elements 114-117 are routed (through a series of components not shown) through the transmit/receive switch module 130 to the receiver module 132 over separate channels. In the example of FIG. 3, only a subset of the components within the receiver module 132 are illustrated, namely down converters 162 and bandpass filters 164. The receive signals from the antenna elements 114-117 have a high frequency (e.g., 1090 MHz) carrier wave. The down converters 162 individually down convert or reduce the fundamental frequency of the receive signals over each incoming channel from the high frequency to a desired Intermediate Frequency (IF) (e.g., 60 MHz).

The down converted receive signals are filtered through the bandpass filters 164 and provided over analog lines 142 to the A/D converters 140. The bandpass filters 164 operate to block Direct Current (DC) and high-frequency components of the receive signals. The A/D converters 140 may include four separate high speed analog to digital converters (one for each channel). The analog signals over analog lines 142 are output as separate streams of digital data samples (digital data streams) over corresponding digital channels 144 to the digital phase detector module 146. The sampling rate of the A/D converters 140 may be set such that either the intermediate frequency or the alias of the intermediate frequency (e.g., when under sampled) will lie near approximately ¼ of the sampling frequency. The entire range of the receive signal range will lie within a range of 0 to ½ of the sampling frequency. By way of example, the sampling frequency of the A/D converters 140 may be set to 50 MHz. Hence, the digital data streams output over digital channels 144 will optimally have a center frequency of approximately 12.5 MHz, but may lie at other frequencies such as 10 MHz. Each of the separate digital data streams corresponds to RF signals detected at one of the antenna elements 114-117. Hence, a set of cross first and second digital data streams would be produced by antenna elements 114 and 116, while another set of cross digital data streams would be produced by antenna elements 115 and 117. Optionally, it is possible to use different pairs of antenna elements as inputs for each digital phase interferometer such as adjacent elements (e.g., 114 and 115). Optionally, it is possible to use more than two digital phase interferometers to provide more phase relationships or to handle more antenna elements.

In the example of FIG. 3, the digital phase detector module 146 includes a pair of digital phase interferometers 166 and 168. Both of the digital phase interferometers 166 and 168 operate in a similar manner and may be implemented in different logic devices or in a single logic device such as a Field Programmable Gate Array (FPGA). The digital phase interferometer 166 receives cross digital data streams from cross channels 124 and 126. The digital phase interferometer 168 receives cross digital data streams from cross channels 125 and 127.

Each of the digital phase interferometers 166 and 168 performs in-phase and quadrature operations to calculate in-phase (I) data and quadrature (Q) data. Each of the digital phase interferometers 166 and 168 shifts each of the incoming data streams by a predetermined amount of time to form first and second phase shifted digital data streams. Each of the digital phase interferometers 166 and 168 produces an I data stream based on the original cross data streams (undelayed and without any phase shift). Each of the digital phase interferometers 166 and 168 produces a Q data stream based upon opposite combinations of cross data streams, where each combination includes an undelayed data stream and a phase shifted data stream. Each digital phase interferometer 166 and 168 outputs an I data stream 172, a Q data stream 174, and an A data stream 176.

The surveillance module 148 controls the processor module 158 in connection with bearing determination to perform cross antenna element phase difference calculations at modules 178 and 180. The cross antenna element phase differences are supplied to a bearing calculation module 182 that ultimately determines a bearing 184 of a target.

Figure 4:
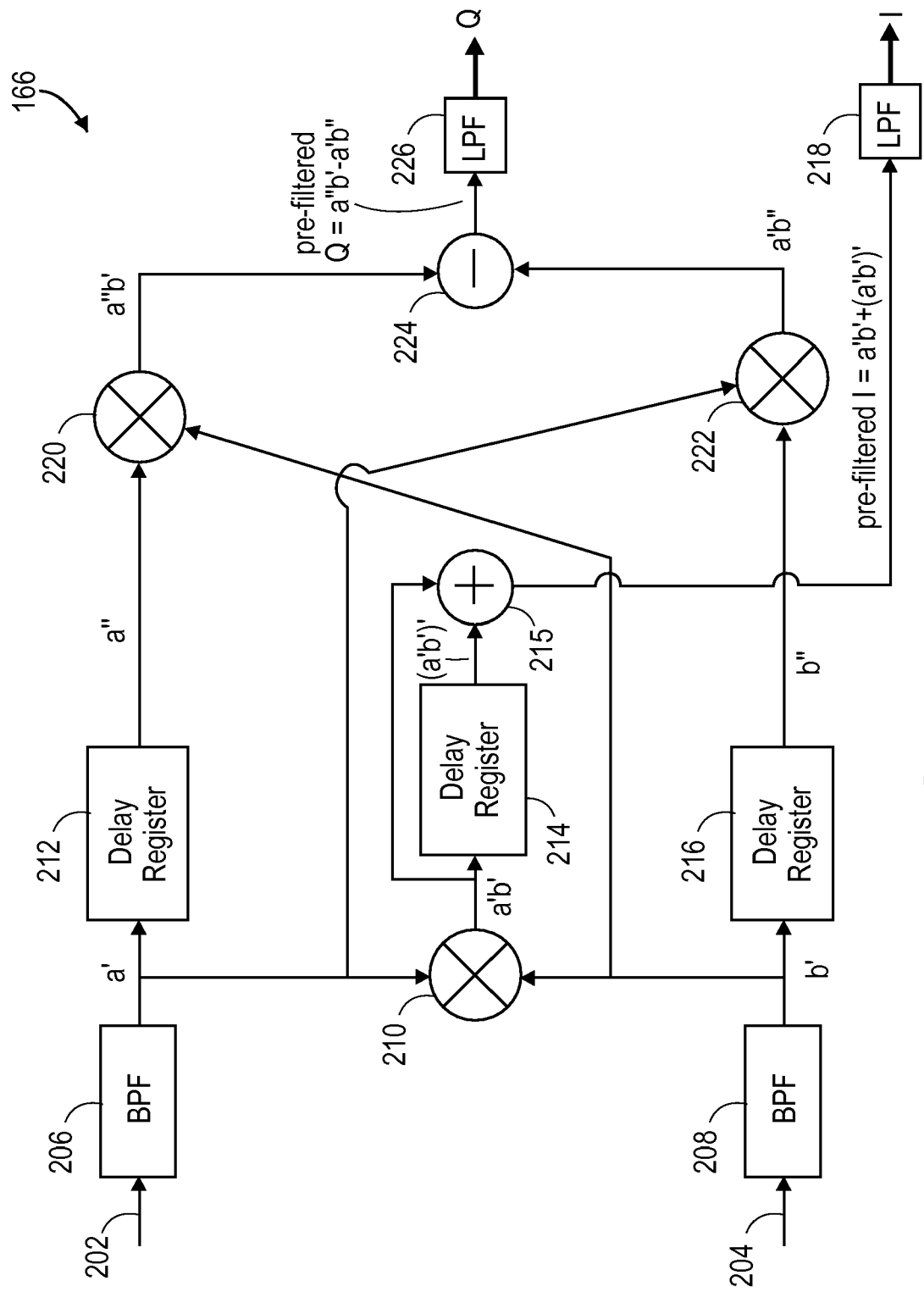
FIG. 4 illustrates a block diagram of one exemplary implementation of a digital phase interferometer.

FIG. 4 illustrates a block diagram of one exemplary implementation of a digital phase interferometer 166. The digital phase interferometer 166 receives, over first and second channels 144 (FIG. 3), cross first and second data streams 202 and 204. The cross first and second data streams 202 and 204 are supplied to bandpass filters 206 and 208 for filtering. The data streams output by the bandpass filters 206 and 208, as denoted by letters a' and b', are provided to a mixer 210 which combines the data streams a' and b' by multiplication to form a mixed in-phase data stream a'b'. The mixed in-phase data stream a'b' is passed through a delay register 214 which introduces a fixed time delay, for example an amount of time delay that corresponds to approximately one quarter of the period of the input waveform at 202 and 204. The output of the delay register 214 is then summed at summer 215 with the in-phase data stream a'b' that is input to the delay register 214 to form a summed in-phase data stream a'b'+(a'b')', the pre-filtered I data stream. The pre-filtered I data stream is then supplied to a low pass filter 218 that filters the input to form an I data stream.

The data streams a' and b' are also provided from the bandpass filters 206 and 208 to delay registers 212 and 216 that delay the incoming data streams a' and b' for the same fixed time delay as in the delay register 214. The phases of the phase shifted data streams a" and b" are shifted relative to the phases of the incoming data streams a' and b', respectively, by approximately 90°. The phase shift is an approximation, as the time delays introduced by the delay registers 212 and 216 are fixed, while the fundamental frequency of the data streams a' and b' may slightly vary. The delay registers 212 and 216 produce phase shifted data streams a" and b". The phase shifted data stream a" is passed to mixer 220, while the phase shifted data stream b" is passed to mixer 222. The original undelayed data stream a' (that has experienced no phase shift) is supplied to the mixer 222, while the original undelayed data stream b' (that has experienced no phase shift) is supplied to mixer 220. The mixer 220 combines the data stream b' and the phase shifted data stream a" by multiplication to form a cross pseudo quadrature component a"b'. The mixer 222 combines the data stream a' and the phase shifted data stream b" by multiplication to form a cross pseudo quadrature component a'b". The cross pseudo quadrature components a"b' and a'b" are supplied to a difference module 224 that calculates a difference quadrature component, the pre-filtered Q data stream. The pre-filtered Q data stream is passed to a low pass filter 226 that outputs a Q data stream. The low pass filter 226 filters the pre-filtered Q data to form a Q data stream.

The delay registers 212 and 216, and the mixers 220 and 222 cooperate to calculate opposite first and second cross pseudo quadrature components based on reverse combinations of the first and second phase shifted data streams a" and b" and the undelayed data streams a' and b'. Thus, the digital phase interferometer 166 calculates the pre-filtered Q data stream based on the undelayed data streams a' and b' and the phase shifted data streams a" and b". The I data stream and Q data stream are supplied to the surveillance module 148 (FIG. 3).

Figure 5:
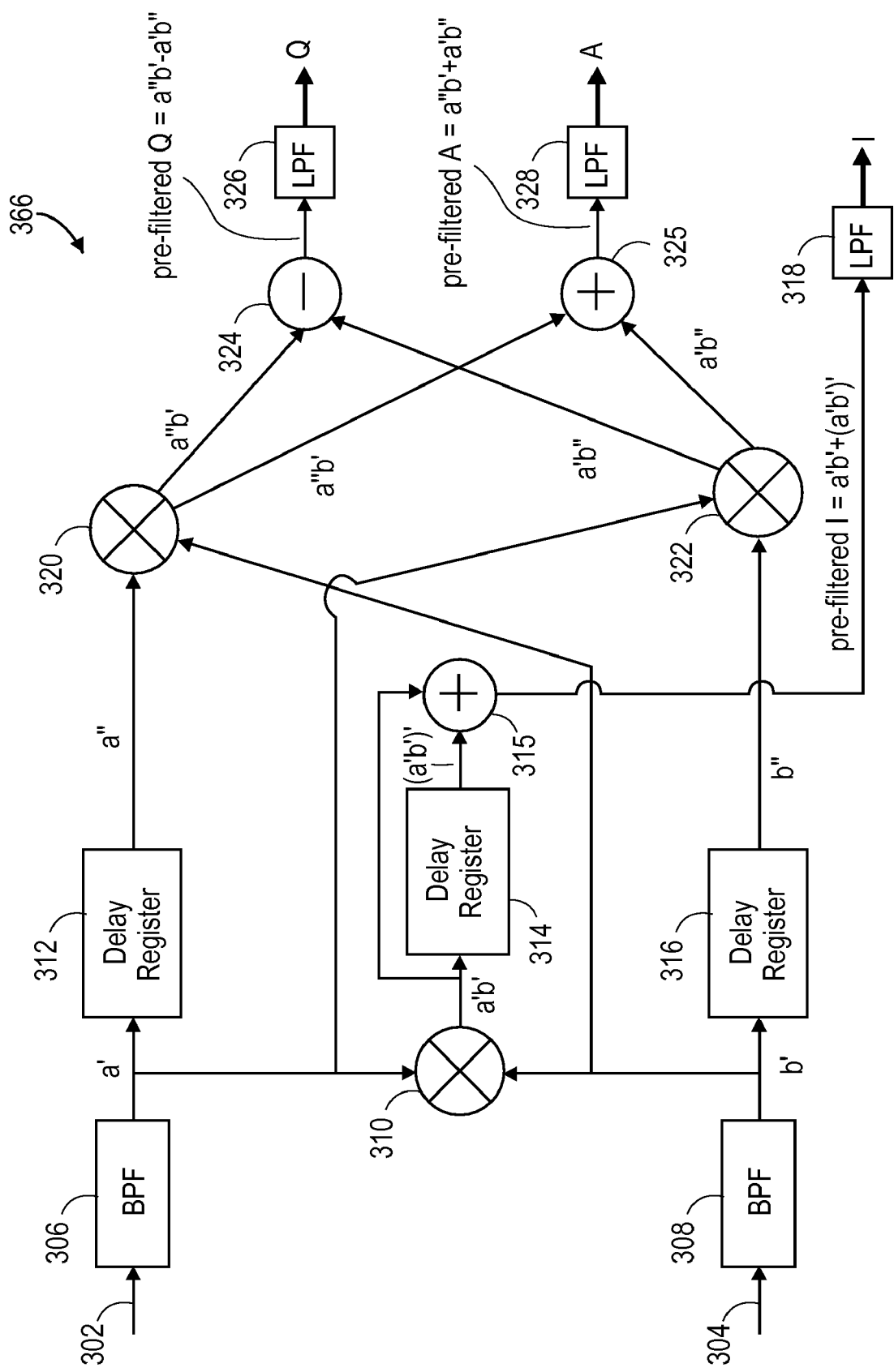
FIG. 5 illustrates a block diagram of an alternative implementation of a digital phase interferometer.

FIG. 5 illustrates a block diagram of an alternative implementation of a digital phase interferometer 366. The digital phase interferometer 366 receives, over first and second channels 144 (FIG. 3) cross first and second digital data streams 302 and 304. The cross data streams 302 and 304 are supplied to bandpass filters 306 and 308 for filtering. The cross data streams output from the bandpass filters 306 and 308 are denoted by letters a' and b', and are provided to a mixer 310 which combines the data streams a' and b' by multiplication to form a mixed in-phase data stream a'b'. The mixed in-phase data stream a'b' is passed through a delay register 314 which introduces a fixed time delay, for example an amount of time delay that corresponds to approximately one quarter of the period of the input waveform at 302 and 304. The output of the delay register 314 is then summed at summer 315 with the in-phase data stream a'b' that is input to the delay register 314 to form a summed in-phase data stream a'b'+(a'b')', the pre-filtered I data stream. The pre-filtered I data stream is then supplied to a low pass filter 318 that filters the pre-filtered I data stream to form an I data stream.

Returning to the bandpass filters 306 and 308, the data streams a' and b' are also provided to delay registers 312 and 316 that delay the incoming data streams a' and b' for the same fixed time delay as in the delay register 314. The phases of the phase shifted data streams a" and b" are shifted relative to the phases of the incoming data streams a' and b', respectively, by approximately 90°. As in the example of FIG. 4, the phase shift is an approximation. The delay registers 312 and 316 produce phase shifted data streams a" and b". The phase shifted data stream a" is passed to a mixer 320, while the phase shifted data stream b" is passed to a mixer 322. The data stream a' is supplied to the mixer 322, while the data stream b' is supplied to mixer 320. The mixer 320 combines the un-delayed data stream b' and the phase shifted data stream a" by multiplication to form a cross pseudo quadrature component a"b'. The mixer 322 combines the un-delayed data stream a' and the phase shifted data stream b" by multiplication to form a cross pseudo quadrature component a'b".

The cross pseudo quadrature components a''b' and a'b'' are supplied to a difference module 324 and to a summer module 325. The difference module 324 calculates a pre-filtered difference pseudo-quadrature data stream (a pre-filtered Q data stream), similar to the pre-filtered Q data stream discussed above, while the summer module 325 calculates a pre-filtered summed pseudo-quadrature data stream (a pre-filtered A data stream). The pre-filtered Q data stream is passed to a low pass filter 326 that filters the pre-filtered Q data to form a Q data stream. The pre-filtered A data stream is passed to a low pass filter 328 that filters the pre-filtered A data to form an A data stream.

The delay registers 312 and 316, and the mixers 320 and 322 cooperate to calculate first and second cross pseudo quadrature components based on reverse combinations of the first and second phase shifted data streams a'' and b'' and the undelayed data streams a' and b'. The digital phase interferometer 366 calculates the pre-filtered Q data stream and the pre-filtered A data stream based on the undelayed data streams a' and b' and the phase shifted data streams a'' and b''. The I, Q, and A data streams are supplied to the surveillance module 148 (FIG. 3).

The digital phase interferometers 166 and 168 find both a cross pseudo-quadrature component (e.g., a'b'') and the opposite cross pseudo-quadrature component (e.g., a''b') by flipping the channel that is delayed. When both cross pseudo-quadrature components are used, a better estimation may be found for the relative phase between the two channels. Also, when the sum and difference of both cross pseudo-quadrature components are used to produce both Q and A streams, the estimate of the relative phase difference is independent of frequency. When either FIG. 4 or FIG. 5 is used within the context of FIG. 3, the system is independent of amplitude, DC offset, and common phase offset.

Returning to FIG. 3, the I, Q, and A data streams 172, 174, and 176 are provided to the surveillance module 148. Next, the modules 178 and 180 determine the cross element phase difference between the pair of cross channels 124 and 126, and the phase difference between the pair of cross channels 125 and 127, respectively. As the modules 178 and 180 operate in the same manner, only one module is described hereafter. Module 178 may use one of the following equations to find the phase differences between the cross data streams 202 and 204 (or 302 and 304) associated with the single pair of cross channels 124 and 126. Equation 1 illustrates a simple phase difference calculation.

$$\theta = \arctan\left(\frac{Q}{I}\right) \quad \text{Equation 1}$$

Optionally, Equation 2 illustrates a method for correcting the case for when the digital cross data streams 202 and 204 do not correspond to ¼ of the sample frequency. In Equation 2, $f_r$ represents a frequency of the received digital cross data streams 202 and 204 (e.g., 10 MHz) and $f_s$ is a sample frequency (e.g., 50 MHz).

$$\theta = \arctan\left(\frac{Q}{I \cdot \sin\left(2\pi \frac{f_r}{f_s}\right)}\right) \quad \text{Equation 2}$$

Optionally, the module 178 may use Equation 3 when the received signals may have an unknown frequency. When it is desirable to use Equation 3, the embodiment described above in connection with FIG. 5 affords good frequency independence. Equation 3 may be used for finding the phase difference between the data streams 302 and 304.

$$\theta = \arctan\left(\frac{Q}{I \cdot \sqrt{\left|1 - \left(\frac{A}{I}\right)^2\right|}}\right) = \arctan\left(\frac{Q}{\text{sign}(I)\sqrt{|I^2 - A^2|}}\right) \quad \text{Equation 3}$$

Optionally, the module 178 may not utilize a square root operation due to practical equipment limitations, but instead utilize an arc cosine operation. Equation 4 illustrates the process by which the phase difference may be calculated using arc cosine operations.

$$\theta = \frac{\arccos\left(\frac{|I^2 - A^2| - Q^2}{|I^2 - A^2| + Q^2}\right)}{2} \quad \text{Equation 4}$$

Note that these solutions may contain certain ambiguities regarding the quadrant containing the phase difference, such as when using the arc cosine solution. In the case of the arc tangents, it depends on version of the arctan being used and whether signs are preserved. The following guidelines help determine the correct quadrant, namely (1) when I is positive, then it is known that the signal is on the right half plane, otherwise it is on the left hand plane or the vertical axis; and (2) when Q is positive, then it is known that the signal is on the top half plane, otherwise it is on the lower half plane or the horizontal axis.

Once the phase differences are determined, the module 182 calculates the bearing, such as based on Equation 5. $\theta_{AC}$ is the phase measurement output from arctangent module 178. $\theta_{BD}$ is the phase measurement output from arctangent module 180. $\gamma_{AC}$ is the value of $\theta_{AC}$ when signals of equivalent phase are fed to antenna elements 114 and 116. $\gamma_{BD}$ is the value of $\theta_{BD}$ when signals of equivalent phase are fed to antenna elements 115 and 117. $\gamma_{AC}$ and $\gamma_{BD}$ may be determined by several indirect calibration methods outside the scope of this patent.

$$\begin{aligned}
\text{bearing} &= \arctan\left(\frac{\text{mod}(\theta_{AC} - \gamma_{AC} + 180°, 360°) + \text{mod}(\theta_{BD} - \gamma_{BD} + 180°, 360°) - 360°}{\text{mod}(\theta_{AC} - \gamma_{AC} + 180°, 360°) - \text{mod}(\theta_{BD} - \gamma_{BD} + 180°, 360°) - 360°}\right) \\
&\quad \frac{180°}{\pi} \\
&= \arctan\left(\frac{\text{mod}(\theta_{BD} - \gamma_{BD} + 180°, 360°) - 180°}{\text{mod}(\theta_{AC} - \gamma_{AC} + 180°, 360°) - 180°}\right) \\
&\quad \frac{180°}{\pi} + 45°
\end{aligned} \quad \text{Equation 5}$$

The calculation in Equation 5 may use an arc tangent function that takes both a X and Y parameter in order to get all 360 degrees of coverage.

In yet another embodiment of the present invention, the surveillance module 148 may estimate the elevation angle as well when using four elements, all adjacent elements are spaced equally, all opposite elements are spaced equally, and all elements are in one plane, although the elevation angle may not be necessary for operation of a collision avoidance system. The surveillance module 148 may estimate the elevation angle using Equation 6. AC_maxdeviation and BD_maxdeviation are the maximum amount that the phase can swing from a state of matched phase at the two antenna elements to the state when a transmitter is at 0° elevation and is directly in line with the two antenna elements. AC_maxdeviation and BD_maxdeviation are determined in a calibration process.

$$\text{elevation} = \arccos\left(\sqrt{\left(\frac{\text{mod}(\theta_{AC} - \gamma_{AC} + 180°, 360°) - 180°}{AC\_\text{max deviation}}\right)^2 + \left(\frac{\text{mod}(\theta_{BD} - \gamma_{BD} + 180°, 360°) - 180°}{BD\_\text{max deviation}}\right)^2}\right) \cdot \frac{180°}{\pi}. \quad \text{Equation 6}$$

In Equation 6, an ambiguity may exist on a dual antenna installation as to whether the received signal came from the antenna mounted on the top of the aircraft or the antenna mounted on the underside of the aircraft The surveillance module 148 may check against the altitude that is returned by the interrogated transponder for incorrect altitudes being reported. For installations with top and bottom antennas, two antennas may be used together for determining elevation, to remove the ambiguity of top or bottom reception.

While the invention has been described in terms of various specific embodiments, those skilled in the art will recognize that the invention can be practiced with modification within the spirit and scope of the claims.

What is claimed is:

1. A system for estimating bearing of a target based on RF signals received by an array of antenna elements, the system comprising:
   first and second analog lines for receiving analog signals corresponding to first and second antenna elements within the antenna element array;
   an A/D converter module for converting each of the analog signals to digital data and for outputting separate digital data streams corresponding to each of the first and second antenna elements;
   a phase shift module for shifting each of the first and second data streams by a predetermined amount of time to form first and second phase shifted data streams,
   a phase detector module for calculating in-phase (I) data based on the first and second data streams and for calculating quadrature (Q) data based on the first and second data streams and the first and second phase shifted data streams; and
   a surveillance module for determining a bearing of the target based on the I and Q data,
   wherein the phase detector module calculates a mixed in-phase data stream by multiplying the first and second data streams and includes a delay module that delays the mixed in-phase data stream by a fixed time delay to output the delayed mixed in-phase data stream.

2. The system of claim 1, wherein the phase detector module is implemented on a field programmable gate array programmed to function as a digital phase interferometer.

3. The system of claim 1, wherein the phase detector module calculates the I data by low-pass filtering the sum of the mixed in-phase data stream and the delayed mixed in-phase data stream.

4. The system of claim 1, wherein the input channels are configured to receive high frequency analog signals from the individual corresponding antenna elements, the system further comprising down converters, provided along the input channels, down converting the high frequency analog signals to intermediate frequency analog signals before being conveyed to the A/D converter module.

5. The system of claim 1, wherein the surveillance module determines phase values based on arctangents of the I and Q data, and determines the bearing based on the arctangent of the phase values.

6. A system for estimating bearing of a target based on RF signals received by an array of antenna elements, the system comprising:
   first and second analog lines for receiving analog signals corresponding to first and second antenna elements within the antenna element array;
   an A/D converter module for converting each of the analog signals to digital data and for outputting separate digital data streams corresponding to each of the first and second antenna elements;
   a phase shift module for shifting each of the first and second data streams by a predetermined amount of time to form first and second phase shifted data streams,
   a phase detector module for calculating in-phase (I) data based on the first and second data streams and for calculating quadrature (Q) data based on the first and second data streams and the first and second phase shifted data streams; and
   a surveillance module for determining a bearing of the target based on the I and Q data,
   wherein the phase detector module includes first and second delay modules that delay the first and second data streams, respectively, by a fixed time delay to output the first and second phase shifted data streams, the digital phase detector module calculating the Q data based on the first and second data streams and the first and second phase shifted data streams.

7. A system for estimating bearing of a target based on RF signals received by an array of antenna elements, the system comprising:
   first and second analog lines for receiving analog signals corresponding to first and second antenna elements within the antenna element array;
   an A/D converter module for converting each of the analog signals to digital data and for outputting separate digital data streams corresponding to each of the first and second antenna elements;
   a phase shift module for shifting each of the first and second data streams by a predetermined amount of time to form first and second phase shifted data streams,
   a phase detector module for calculating in-phase (I) data based on the first and second data streams and for calculating quadrature (Q) data based on the first and second data streams and the first and second phase shifted data streams; and
   a surveillance module for determining a bearing of the target based on the I and Q data,
   wherein the phase detector module calculates a first pseudo-quadrature component by multiplying the first phase shifted data stream and the second data stream and calculates a second pseudo-quadrature component by multiplying the second phase shifted data stream and the first data stream.

8. The system of claim 7, wherein the phase detector module calculates the Q data by subtracting the first pseudo-quadrature component and the second pseudo-quadrature component.

9. A system for estimating bearing of a target based on RF signals received by an array of antenna elements, the system comprising:
  first and second analog lines for receiving analog signals corresponding to first and second antenna elements within the antenna element array;
  an A/D converter module for converting each of the analog signals to digital data and for outputting separate digital data streams corresponding to each of the first and second antenna elements;
  a phase shift module for shifting each of the first and second data streams by a predetermined amount of time to form first and second phase shifted data streams,
  a phase detector module for calculating in-phase (I) data based on the first and second data streams and for calculating quadrature (Q) data based on the first and second data streams and the first and second phase shifted data streams; and
  a surveillance module for determining a bearing of the target based on the I and Q data,
  wherein the phase detector module low-pass filters the pre-filtered I data to form filtered I data and low-pass filters the pre-filtered Q data to form filtered Q data, the surveillance module calculating the bearing based on the filtered I and Q data.

10. A method for estimating bearing of a target based on RF signals received by an array of antenna elements, the method comprising:
  receiving analog signals from first and second antenna elements within an antenna element array;
  converting each of the analog signals to digital data and outputting separate digital data streams corresponding to each of the first and second antenna elements;
  shifting each of the first and second data streams by a predetermined amount of time to form first and second phase shifted data streams;
  calculating in-phase (I) data based on the first and second data streams;
  calculating a mixed in-phase data stream by multiplying the first and second data streams;
  delaying the mixed in-phase data stream by a fixed time delay to output the delayed mixed in-phase data stream;
  calculating quadrature (Q) data based on the first and second data streams and the first and second phase shifted data streams; and
  determining a bearing of the target based on the I and Q data.

11. The method of claim 10, further comprising calculating the I data by low-pass filtering the sum of the mixed in-phase data stream and the delayed mixed in-phase data stream.

12. The method of claim 10, wherein the antenna elements receive high frequency analog signals, the method further comprising down converting the high frequency analog signals to intermediate frequency analog signals before being converted to the digital data samples.

13. A method for estimating bearing of a target based on RF signals received by an array of antenna elements, the method comprising:
  receiving analog signals from first and second antenna elements within an antenna element array;
  converting each of the analog signals to digital data and outputting separate digital data streams corresponding to each of the first and second antenna elements;
  shifting each of the first and second data streams by a predetermined amount of time to form first and second phase shifted data streams;
  calculating in-phase (I) data based on the first and second data streams;
  calculating quadrature (Q) data based on the first and second data streams and the first and second phase shifted data streams; and
  determining a bearing of the target based on the I and Q data,
  further comprising delaying the first and second data streams, respectively, by a fixed time delay to output the first and second phase shifted data streams, and calculating the Q data based on the first and second data streams and the first and second phase shifted data streams.

14. A method for estimating bearing of a target based on RF signals received by an array of antenna elements, the method comprising:
  receiving analog signals from first and second antenna elements within an antenna element array;
  converting each of the analog signals to digital data and outputting separate digital data streams corresponding to each of the first and second antenna elements;
  shifting each of the first and second data streams by a predetermined amount of time to form first and second phase shifted data streams;
  calculating in-phase (I) data based on the first and second data streams;
  calculating quadrature (Q) data based on the first and second data streams and the first and second phase shifted data streams; and
  determining a bearing of the target based on the I and Q data,
  further comprising calculating a first pseudo-quadrature component by multiplying the first phase shifted data stream and the second data stream, calculating a second pseudo-quadrature component by multiplying the second phase shifted data stream and the first data stream.

15. The method of claim 14, wherein calculating the Q data comprises subtracting the first pseudo-quadrature component and the second pseudo-quadrature component.

16. A method for estimating bearing of a target based on RF signals received by an array of antenna elements, the method comprising:
  receiving analog signals from first and second antenna elements within an antenna element array;
  converting each of the analog signals to digital data and outputting separate digital data streams corresponding to each of the first and second antenna elements;
  shifting each of the first and second data streams by a predetermined amount of time to form first and second phase shifted data streams;
  calculating in-phase (I) data based on the first and second data streams;
  calculating quadrature (Q) data based on the first and second data streams and the first and second phase shifted data streams; and
  determining a bearing of the target based on the I and Q data,
  further comprising low-pass filtering the pre-filtered I data to form filtered I data, low-pass filtering the pre-filtered Q data to form filtered Q data, and calculating the bearing based on the filtered I and Q data.

17. A method for estimating bearing of a target based on RF signals received by an array of antenna elements, the method comprising:

receiving analog signals from first and second antenna elements within an antenna element array;

converting each of the analog signals to digital data and outputting separate digital data streams corresponding to each of the first and second antenna elements;

shifting each of the first and second data streams by a predetermined amount of time to form first and second phase shifted data streams;

calculating in-phase (I) data based on the first and second data streams;

calculating quadrature (Q) data based on the first and second data streams and the first and second phase shifted data streams; and determining a bearing of the target based on the I and Q data, further comprising determining phase values based on the arctangents of the I and Q data, and determining the bearing based on the arctangent of the phase values.

* * * * *